W. KENWORTHY & J. H. POLLITT.

Improvement in Modes of Lubricating Axles and Journals.

No. 115,618. Patented June 6, 1871.

Witnesses:
A. C. Johnston
James J. Johnston

Inventors:
Wm. Kenworthy
John H. Pollitt 115,618

UNITED STATES PATENT OFFICE.

WILLIAM KENWORTHY AND JOHN H. POLLITT, OF BIRMINGHAM, PA.

IMPROVEMENT IN MODES OF LUBRICATING AXLES AND JOURNALS.

Specification forming part of Letters Patent No. 115,618, dated June 6, 1871.

*To all whom it may concern:*

Be it known that we, WILLIAM KENWORTHY and JOHN H. POLLITT, of Birmingham, in the county of Allegheny and State of Pennsylvania, have invented a new and useful Improvement in Lubricating Axles, Journals, &c., being an improvement of the patent granted to us December 7, 1869, No. 97,651; and we do hereby declare that the following is a full, clear, and exact description thereof, reference being had to the accompanying drawing and to the letters of reference marked thereon.

The nature of our invention consists in the arrangement of the oil-chamber, gum washer, and oil-cavity with relation to the bore of the hub of the wheel, when combined with the collar on and the recess in the axle, and pin and cap of the wheel, the whole being constructed as hereinafter described.

To enable others skilled in the art to make and use our invention, we will proceed to describe its construction and operation.

Figure 1:
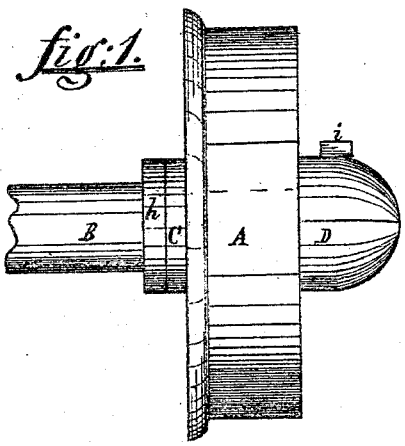
Figure 2:
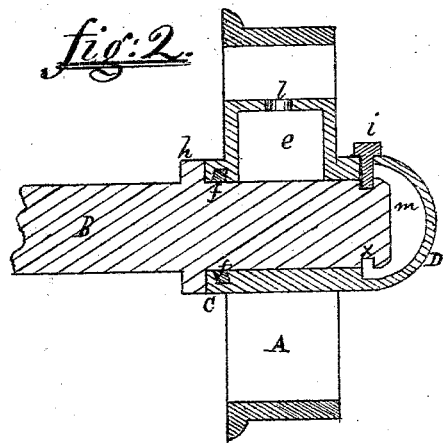
Figure 3:
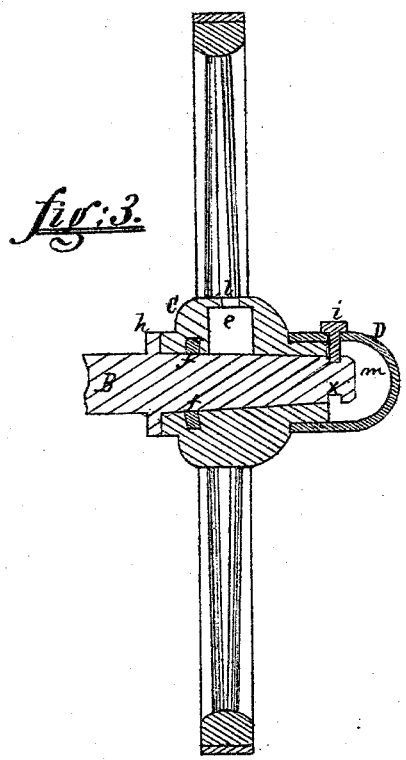

In the accompanying drawing, which forms part of our specification, Figure 1 is a front view of a car-wheel provided with our improvement. Fig. 2 is a vertical and transverse section of the same. Fig. 3 is a vertical and transverse section of a carriage-wheel when provided with our improvement.

In the accompanying drawing, A represents the car-wheel, and B its axle, which is provided with a collar, $h$; and near its outer end is a recess, $x$, in which is fitted a bolt, $i$. The collar $h$, recess $x$, and bolt $i$ are for the purpose of holding the wheel on the axle. C represents the hub of a wheel, and is provided with an oil-chamber, $e$, which, by means of a suitable opening in its bottom, communicates with the axle and bore of the hub. In the top of the chamber $e$ is an opening, $l$, which is used for the purpose of filling the chamber $e$ with the lubricating matter. In the bore of the hub C, near its inner end, is a recess, in which is placed a gum ring or washer, $f$, the diameter of the opening of which corresponds to the diameter of that part of the axle which it surrounds. D represents a cap which is placed on the outer end of the hub or journal-box, and is used for the purpose of preventing the wasting of the lubricating matter and keeping it in contact with the axis of the wheel or shaft in the hub or journal-box.

The lubricating matter is placed in the chamber $e$, and the opening $l$ is closed by a plug, cap, or other device, and the revolving of the wheel or shaft will cause it to be properly lubricated by the lubricating matter flowing down through the opening in the bottom of the chamber $e$; and the gum or elastic ring or washer will prevent the lubricating matter from flowing out and wasting at the inner end of the hub or journal-box, and the chamber $m$ of the cap D will prevent it from wasting at the outer end of the hub or journal-box.

It will be observed that the recess $x$ in the axle of the wheel is outside of the bore of the hub C, but is in the chamber or cavity $m$; and that the bolt $i$ and the end of the hub, and also the groove $x$, will be properly lubricated by the lubricating matter that accumulates in the chamber $m$.

The advantage of having the bolt $i$ in the cap D and the groove $x$ in the axle B outside of the bore of the hub, consists in the ease and facility of fitting the bolt $i$ in the groove $x$, and in the removal of the bolt for the purpose of removing the wheel from its axle.

The advantage of the gum or elastic ring or washer $f$ consists in preventing dust, dirt, and sand from getting in between the surface of the bore of the hub and the surface of the axle within it, and also prevents the wasting of the lubricating matter. By excluding the dust, dirt, and sand, and preventing the escape of the lubricating matter, the axis of the wheel or shaft will be more durable, and much time, trouble, and labor will be saved in keeping them properly lubricated.

Having thus described the nature, construction, and operation of our improvement, what we claim as of our invention is—

The arrangement of the oil-chamber $e$, gum washer $f$, and cavity with relation to the bore of the hub C of the wheel A, and collar $h$ on, and recess $x$ in, the axle B, the whole constructed, arranged, and operating as herein described, and for the purpose set forth.

WM. KENWORTHY.
JOHN H. POLLITT.

Witnesses:
A. C. JOHNSTON,
JAMES J. JOHNSTON.